United States Patent [19]

Ornstein et al.

[11] Patent Number: 4,645,120

[45] Date of Patent: Feb. 24, 1987

[54] THERMOSTATIC METAL

[75] Inventors: Jacob L. Ornstein, Reidsville; Michael A. Hydock, Greensboro, both of N.C.

[73] Assignee: GTE Products Corporation, Stamford, Conn.

[21] Appl. No.: 694,309

[22] Filed: Jan. 22, 1985

Related U.S. Application Data

[62] Division of Ser. No. 453,361, Dec. 27, 1982.

[51] Int. Cl.⁴ .............................................. B23K 20/04

[52] U.S. Cl. .................................... 228/190; 428/616; 428/617; 428/619; 228/235

[58] Field of Search ............... 228/190, 117, 231, 235, 228/243; 428/616, 617, 618, 619

[56] References Cited

U.S. PATENT DOCUMENTS

| | | | |
|---|---|---|---|
| 2,578,197 | 12/1951 | Mudge | 428/619 |
| 2,767,467 | 10/1956 | Siegel | 228/190 |
| 3,512,947 | 5/1970 | Alban | 428/617 |
| 3,767,370 | 10/1973 | Ornstein | 428/617 |
| 3,838,985 | 10/1974 | Ornstein | 428/617 |
| 3,902,867 | 9/1975 | Ornstein | 428/617 |

OTHER PUBLICATIONS

Cahn, *Physical Metallurgy*, 1971, p. 1175, North Holland Pub. Co.

*Primary Examiner*—Kenneth J. Ramsey
*Assistant Examiner*—Christopher L. McKee
*Attorney, Agent, or Firm*—James Theodosopoulos

[57] ABSTRACT

A thermostatic metal comprises a layer of a low expansion metal bonded to a layer of a high expansion metal, the outer surface of one of the layers comprising a layer of similar composition but containing, in addition, a grain growth limiting additive.

1 Claim, 1 Drawing Figure

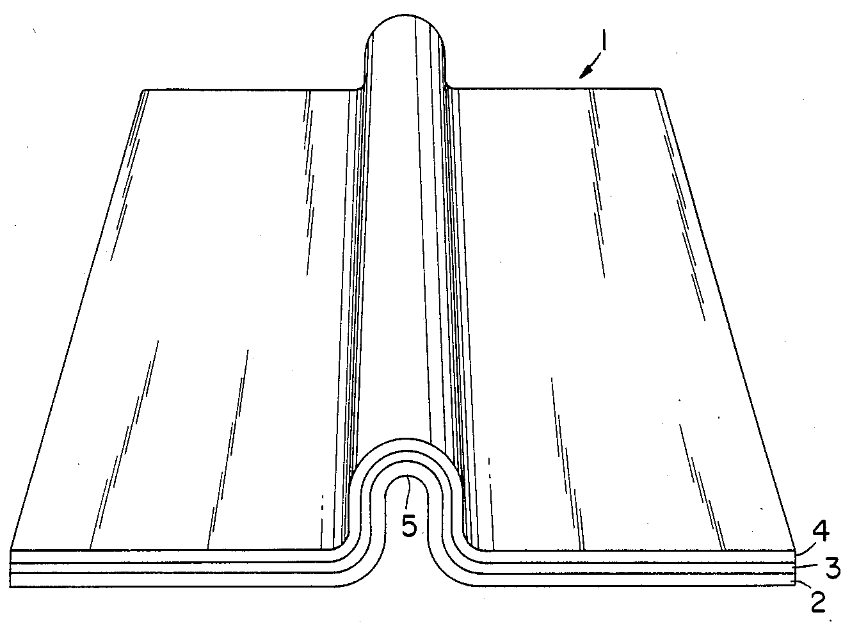
1
5
4
3
2

THERMOSTATIC METAL

This application is a division of application Ser. No. 453,361, filed Dec. 27, 1982.

This invention is concerned with clad thermostatic metals. Such clad metals comprise a high expansion metal bonded to a low expansion metal and are shown, for example, in U.S. Pat. Nos. 4,131,720, 4,115,624, 4,050,906, 4,013,425, 3,902,867, 3,838,985, 3,829,296, 3,782,908 and 3,765,846.

One application for such clad metals is as a support member for a shadow mask in a color television tube, as disclosed in U.S. Pat. No. 3,838,985. As pointed out therein, a commonly used clad metal comprises a 22Ni-3Cr-balance Fe (22% nickel, 3% chromium, balance iron) alloy for the high expansion metal and a 36Ni-balance Fe alloy for the low expansion metal. Occasionally, when said clad metal is formed into a desired support member shape, orange peel occurs on the surface thereof, especially at a bend. Orange peel occurs because of relatively large grains in the metal. Orange peel is undesirable because contaminants can be entrapped in the crevices thereof.

This invention solves the problem of orange peel in such an application by replacing a minor portion of the low expansion alloy with an alloy of similar composition (so that the thermostatic properties remain the same) but containing, in addition, a small amount of an additive which limits grain growth. In some applications it may be the high expansion alloy which includes a layer thereof containing a grain growth limiting additive. And in other applications, both alloys may contain such layers. The layers containing the grain growth limiting additives should be on the external surfaces.

The drawing shows a clad thermostatic metal support member in accordance with this invention.

In one embodiment, a clad thermostatic metal in accordance with this invention comprised a support member 1 comprising a three layer composition of a high expansion layer 2, a low expansion layer 3 bonded thereto and a low expansion layer 4 of similar composition to layer 3, but additionally containing a grain growth limiting additive, bonded to layer 3.

In a specific example, support member 1 was $1\frac{7}{8}$ inches long by 1 7/16 inches wide by 90 mils thick. Support member 1 had formed a tunnel 5 therein which was about $\frac{1}{4}$ inch high by about 1/16 inch inside radius. High expansion layer 2 comprised about 50% of the thickness of member 1 and consisted of 22Ni-3Cr-balance Fe alloy. Low expansion layer 3 comprised about 33% of the thickness of member 1 and consisted of 36 Ni-balance Fe alloy. Low expansion layer 4 comprised about 18% of the thickness of member 1 and consisted of 36Ni-balance Fe alloy containing a small amount of magnesium oxide as a grain growth limiting additive.

The clad thermostatic metal was made by roll bonding, as shown in U.S. Pat. Nos. 3,646,591 and 2,691,815, three layers comprising 153 mil thick 22Ni-3Cr-balance Fe alloy, 112 mil thick 36Ni-balance Fe alloy and 58 mil thick 36Ni-balance Fe alloy containing a dispersed phase of about 0.03 weight percent magnesium oxide as a grain growth inhibitor. The total thickness of the three layer composite before and after roll bonding was 323 mils and 115 mils respectively. After roll bonding, the composite was heated at 2100° F. for three hours, cleaned and then rolled to 90 mils thickness. When support member 1 was made from this three layer composite, there was no orange peel on the outside of tunnel 5. When support member 1 was made without the grain growth limiting additive, there was considerable orange peel on the outside of tunnel 5.

The thickness of the layer containing the grain growth limiting additive should be sufficient to prevent the possibility of large grain size in the sub layer, e.g. layer 3, from imprinting onto the outer surface of the outside layer, e.g. layer 4.

We claim:

1. A method of making a thermostatic metal member that is susceptible to orange peel on a surface thereof comprising the steps of: roll bonding a three layer composite comprising a high expansion metal, a first low expansion metal and a second low expansion metal substantially the same as the first but containing, in addition, a grain growth limiting additive added in an amount to substantially inhibit orange peel; heating, cleaning and rolling the bonded three layer composite to a predetermined thickness; forming a support member from said rolled composite so that the surface susceptible to orange peel comprises the layer containing the grain growth limiting additive; disposing the support member in position to form a tunnel therein; forming a tunnel approximately at the center of the support member so that the tunnel has an outer surface of the tunnel comprising the layer of low expansion metal containing the grain growth limiting additive, the support member being an essentially flat member except for the tunnel.

* * * * *